(12) United States Patent
Wackerly et al.

(10) Patent No.: US 8,654,652 B2
(45) Date of Patent: Feb. 18, 2014

(54) SYSTEM FOR MANAGING THE SIZE OF A HARDWARE ROUTING TABLE

(75) Inventors: Shaun Wackerly, Lincoln, CA (US); Nick E. Demmon, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 13/118,496

(22) Filed: May 30, 2011

(65) Prior Publication Data
US 2012/0307640 A1 Dec. 6, 2012

(51) Int. Cl.
*H04L 1/00* (2006.01)
*H04L 12/26* (2006.01)
*H04L 12/28* (2006.01)

(52) U.S. Cl.
USPC ......................................................... 370/241

(58) Field of Classification Search
USPC ......................................................... 370/241
See application file for complete search history.

(56) References Cited

U.S. PATENT DOCUMENTS

| | | | | |
|---|---|---|---|---|
| 6,801,525 B1 * | 10/2004 | Bodnar et al. | ................ | 370/352 |
| 6,816,457 B1 * | 11/2004 | Bahattab | ...................... | 370/232 |
| 7,035,207 B2 | 4/2006 | Winter et al. | | |
| 7,573,880 B2 | 8/2009 | Kaxiras et al. | | |
| 7,760,742 B2 * | 7/2010 | Wackerly | ..................... | 370/400 |
| 2002/0116535 A1 * | 8/2002 | Ryals et al. | ................... | 709/249 |

FOREIGN PATENT DOCUMENTS

CN 101442491 A 5/2009

OTHER PUBLICATIONS

Jonathan Ellithorpe, Laura Keys; ClickCAM: Exploring Router Power Performance Tradeoffs Using Click; D University of California at Berkeley, Computer Science Department; May 2009; on pp. 1-10.*

Jonathan Ellithorpe, Laura Keys; ClickCAM: Exploring Router Power Performance Tradeoffs Using Click; University of California at Berkeley, Computer Science Department; May 2009; on pp. 1-10.

Haun Liu; Routing Table Compaction in Ternary Cam; Issue Date: Jan./Feb. 2002; Volume: 22 Issue:1; on pp. 58-64; Date of Current Version: Aug. 7, 2002.

Alireza Mahini, Reza Berangi, Hossein Mohtashami and Hamidreza Mahini; Low Power and Storage Efficient Parallel Lookup Engine Architecture for IP Packets; 2009, vol. 6, Part 2, on pp. 718-722.

* cited by examiner

*Primary Examiner* — Mark Rinehart
*Assistant Examiner* — Maharishi Khirodhar

(57) ABSTRACT

A system and method for managing a hardware routing table comprising monitoring usage of entries in said routing table and deleting entries based on usage criteria so as to generally keep the number of entries within a size limit, thereby conserving power.

17 Claims, 6 Drawing Sheets

SYSTEM FOR MANAGING THE SIZE OF A HARDWARE ROUTING TABLE

BACKGROUND OF THE INVENTION

Routers use a routing table to determine where to forward incoming data packets. For example, a router may refer to the routing table to determine the next network hop for an incoming IP packet. As the internet grows and routing becomes more complicated, greater demands are placed on both the size of router tables and the speed of look up. However, a large active memory for storing routes contributes significantly to the power consumption of the router.

BRIEF DESCRIPTION OF THE DRAWINGS

Some examples are described in the following figures.

DETAILED DESCRIPTION

Figure 1:
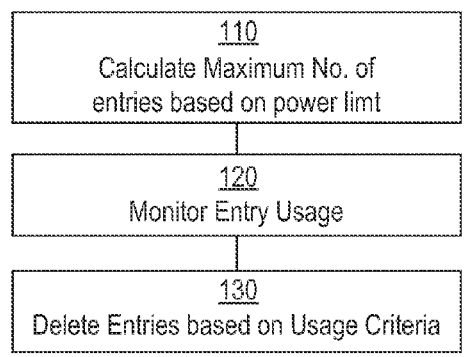
FIG. 1 is a flow diagram showing an example of a method for managing the power usage of a router.

Typically IP routes are identified by a <route prefix, prefix length> pair. When determining where to route an incoming data packet, the router searches for routes in the routing table which have a prefix matching the beginning of the data packet's destination address and then, from amongst any routes which match, chooses the route which has the longest matching prefix (the most specific route). This may take several memory accesses. Content addressable memory may be used to store the routing table. Content addressable memory (CAM) allows searching parallel. Whereas conventional memory returns "data" stored at a particular memory address in response to a request directed to that memory address, CAM returns the memory address at which particular "data" is stored in response to a request specifying the "data". Ternary content addressable memory (TCAM) offers further functionality by allowing the addition of a "mask" which specifies which bits must coincide in order to return a match. E.g. an entry of 10.1.1.1 with a mask 255.255.0.0 will match destination IP addresses from 10.1.0.0 to 10.1.255.255. The first 16 bits of the mask 255.255.0.0 are '1' and thus the mask requires the table entry to coincide with first 16 bits of the input destination IP address in order to return a match. The last 16 bits of the mask are 0 and so the last 16 bits of the table entry are not required to coincide with the destination address in order to return a match. As the mask 255.255.0.0 contains 16 contiguous 1 s, it is said to have a 'mask length' of 16 bits. Written another way the table entry is 10.1.0.0/16 where the /16 indicates a mask length of 16 bits. The ability to add a mask makes TCAM an attractive solution for hardware routing tables.

Dedicated hardware routing tables are typically many times faster than software routing processes. However, hardware routing tables are power hungry and some hardware routing tables have strict requirements regarding the order of entries. Some types of TCAM hardware routing table only return the first matching entry for an input destination address (even if there are several matching entries). In this type of hardware routing table, the routes should be stored in order of decreasing prefix lengths. E.g. a route 10.1.7.0/24 would be stored before a route 10.1.0.0/16. In this way if there are any overlapping entries, the most specific entries are positioned before less specific entries, and so the (first) entry returned as a match will be the most specific entry. However, this approach means that updating the routing table may be complicated due to the need to maintain the correct order. In some cases multiple entries will need to be moved each time a new entry is made. In other cases there may be a delay in entering less specific routes until more specific routes have been resolved.

Power is required to maintain each table entry in the "on" state. Therefore power consumption can be reduced by limiting the number of entries which the table maintains in the "on" state at any one time. For example, entries containing old or infrequently used entries can be switched off or put to 'sleep'. If a router has knowledge of 100,000 routes and a routing table big enough to hold all these routes, but only 1,000 are in active use, then a very significant power saving may be achieved by switching off entries relating to the other 99,000 routes.

FIG. 1 shows an example method of managing the power consumed by a hardware routing table of a router. At 110 of FIG. 1 the maximum number of routes to be held as entries in the table is calculated based on a maximum power specified for the hardware routing table. The power requirement may vary depending on the context in which the routing table is used, e.g. the number of TCAMs attached to a line card of the router, cooling requirements etc. Therefore the user (e.g. a system administrator or owner of the router), may specify a maximum power to be consumed by the routing table (or a maximum power for the router, from which a maximum power for the routing table can be derived). Further this maximum power is configurable and may be adjusted later by user input (e.g. from a control terminal or remote computer with a management application for managing the router). This maximum power for the hardware routing table may be used to calculate a 'size limit' defining a maximum number of route entries to be held in the table such that power consumption does not exceed the desired power limit. Typically, the maximum number of entries calculated in this way will be less than the actual size of the table, and so power savings can be achieved.

At 120 the usage of entries stored in the hardware routing table is monitored. At 130 entries are deleted based on usage criteria so as to keep the number of entries at or below the above mentioned size limit. E.g. if an entry has not been used for a certain period of time, or if an entry falls below a usage frequency threshold over a particular period of time, then that entry may be deleted (e.g. put to sleep or switched off). Usage of an entry means that the entry has been accessed or returned as a most specific match in response to a query to the routing table. 'Generally at or below' the size limit, means that in general the number of entries in the table is kept at or below the number specified in the size limit, but may occasionally exceed the limit, e.g. in the middle of a usage monitoring time period before routes are deleted at the end of said time period.

Figure 2:
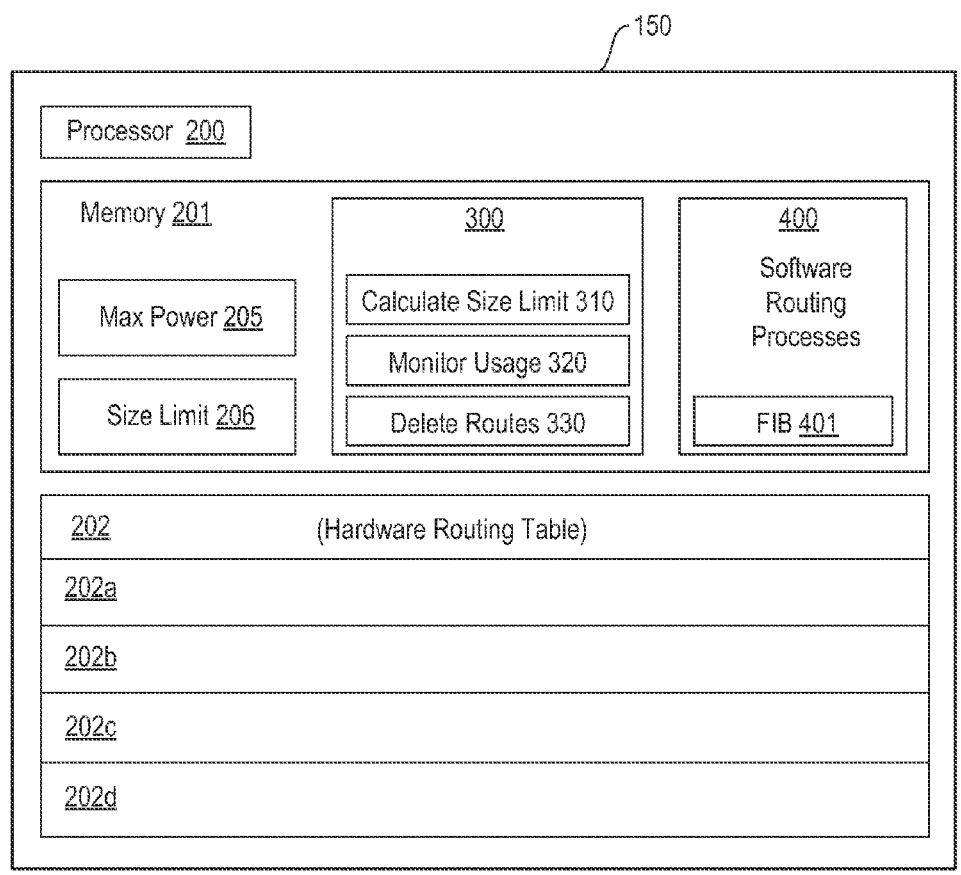
FIG. 2 is a schematic diagram showing an example of a router having a management system for managing the size of its hardware routing table.

FIG. 2 shows an example of a router 150 having a management system which manages the number of entries in the hardware routing table according to the method shown in FIG. 1. The router has a processor 200, a first memory 201 and a second memory 202. The second memory 202 stores a hardware routing table with entries 202a, 202b, 202c, 202d etc. The router may find a suitable route on which to forward an incoming data packet by using the hardware routing table 202 or by using software routing processes 400 which refer to a forwarding information base 401 (described below). As the hardware routing table is typically many times faster than the software routing processes, the router will typically consult the hardware routing table first and only use the software routing processes if no match is found in the hardware routing table. In one example, the second memory 202 which stores the hardware routing table is a TCAM.

The first memory 201 stores a maximum power (205) for the hardware routing table and a size limit (206) defining a maximum number of entries to be held by the routing table. The size limit may be calculated based on the maximum power by a method such as (but not limited to) that described in 110 of FIG. 1. Typically this 'power based' size limit may be less than the actual memory capacity of the hardware routing table. The first memory also stores machine readable instructions 300 for managing the number of entries in the hardware routing table 202, and machine readable instructions 400 for 'software' routing of a data packet if a matching route cannot be found in the hardware routing table. The software routing process may consult a forwarding information base (FIB) 401 stored in the first memory. The processor 200 is capable of reading and executing the machine readable instructions 300 and 400.

The machine readable instructions 300 comprise a size limit calculating module 310, a route monitoring module 320 and a route deleting module 330 which correspond to and carry out the processes described in boxes 110, 120 and 130 respectively of FIG. 1.

Figures 3A, 3B:
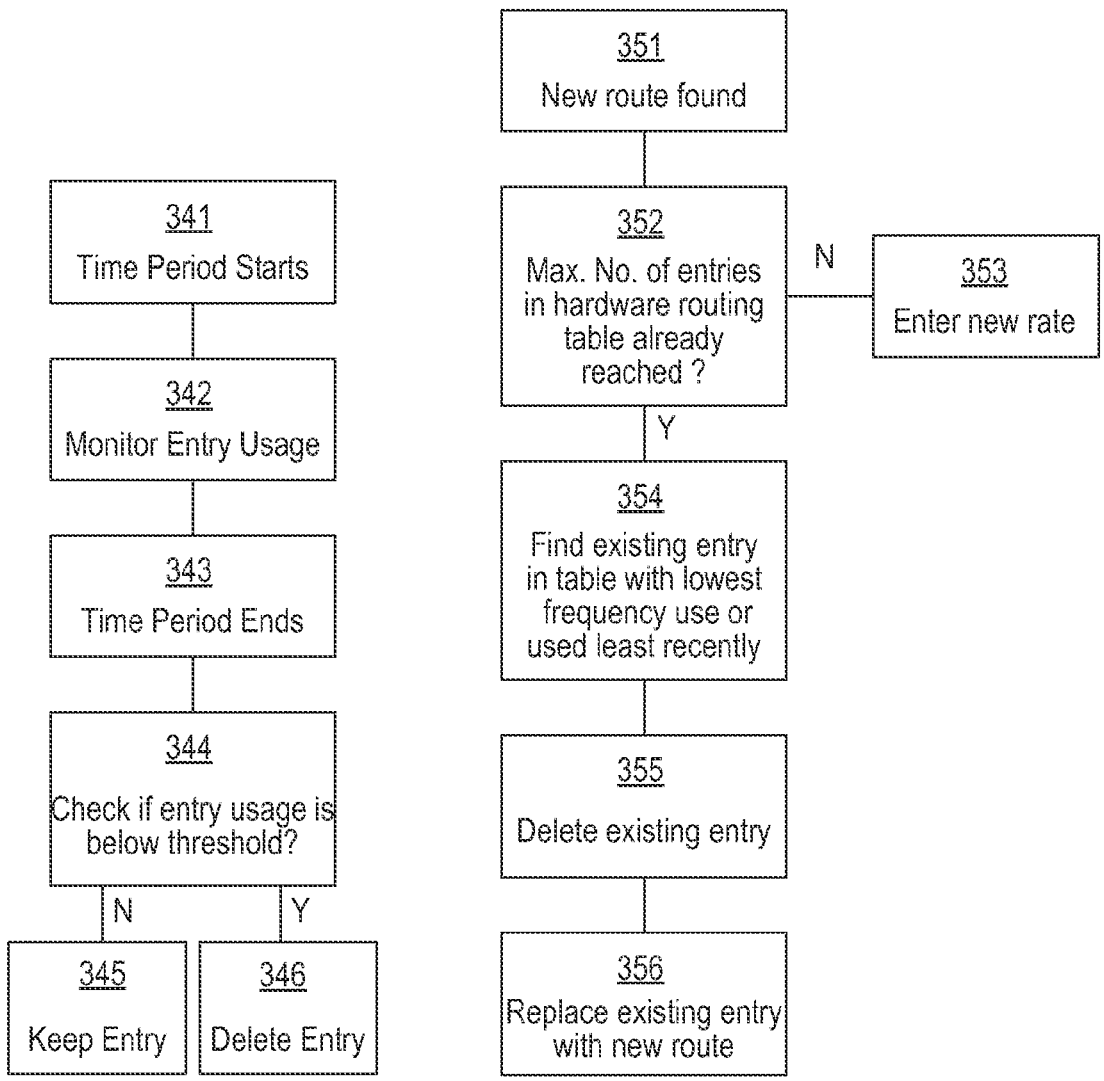
FIG. 3A is a flow diagram showing an example of a method for managing the number of routing table entries.
FIG. 3B is a flow diagram showing another example of a method for managing the number of routing table entries.

One feature of the method of FIG. 1 and the router of FIG. 2 is that route entries are deleted from the hardware routing table 202 according to usage criteria. In the context of this specification "deleting" an entry in the hardware routing table means that the cell containing the entry is switched off or put to sleep or that the entry is overwritten with a new entry. FIGS. 3A and 3B show two example methods for deleting entries in the hardware routing table.

In FIG. 3A entries are deleted when they fall below a usage threshold. At 341 a time period starts and may for instance be counted by starting a timer. During the time period, usage of entries in the routing table is monitored as indicated at 342. For example the method notes when an entry is used, e.g. when an entry is accessed or returned as a matching route. At 343 the time period ends. At 344 an entry is checked to see if it has fallen below a usage threshold in the recently elapsed time period. For instance the usage threshold may require at least a certain frequency of use during the time period or simply any use at all within the time period. If the entry is at or above the usage threshold then it is kept in the table (345), but if its usage in the time period was below the usage threshold then it is deleted at 346, e.g. by turning off the entry so that it no longer consumes power (or consumes less power) and can no longer be searched. Each entry in the table may be checked for usage in the time period and be kept or deleted as appropriate.

An alternative method is shown in FIG. 3B. Whereas in FIG. 3A the entries are monitored and pruned periodically (e.g. after each time period), in FIG. 3B routes are deleted when it is necessary to make space for new entries. At 351 it is determined that the new route should be stored as an entry in the hardware routing table (e.g. a new route has been found or it is otherwise decided that a route not currently in the hardware routing table should be entered into the hardware routing table). This may happen, for example, when a matching route cannot be found in the hardware routing table, but a matching route is found via the software routing processes of module 400. This route may then be stored as an entry in the hardware routing table so that next time a data packet with a similar destination is received it can be routed by the hardware routing table. At 352 a check is made to determine if the maximum number of entries for the routing table (as specified by the 'size limit' mentioned above) has already been reached. If the hardware routing table has not reached the maximum number of entries then the new entry is stored in the hardware routing table at 353. However, if the hardware routing table already has the maximum number of entries then space needs to be made before the new entry can be stored. Thus, at 354 a check is made to find a suitable entry for deleting. For example the entry which was accessed the least recently or an entry which has the lowest usage frequency (over a certain time period) may be identified at 354 based on the monitoring of 120 of FIG. 1. That entry may then be deleted at 355 and replaced with the new entry at 356. The deleting and replacing of 355 and 356 may be performed as two separate steps or a single step by sampling overwriting the old entry with the new entry. The methods of FIGS. 3A and 3B may be stored as instructions 330 in the first memory 201 and executed by the processor 200.

Figure 4:
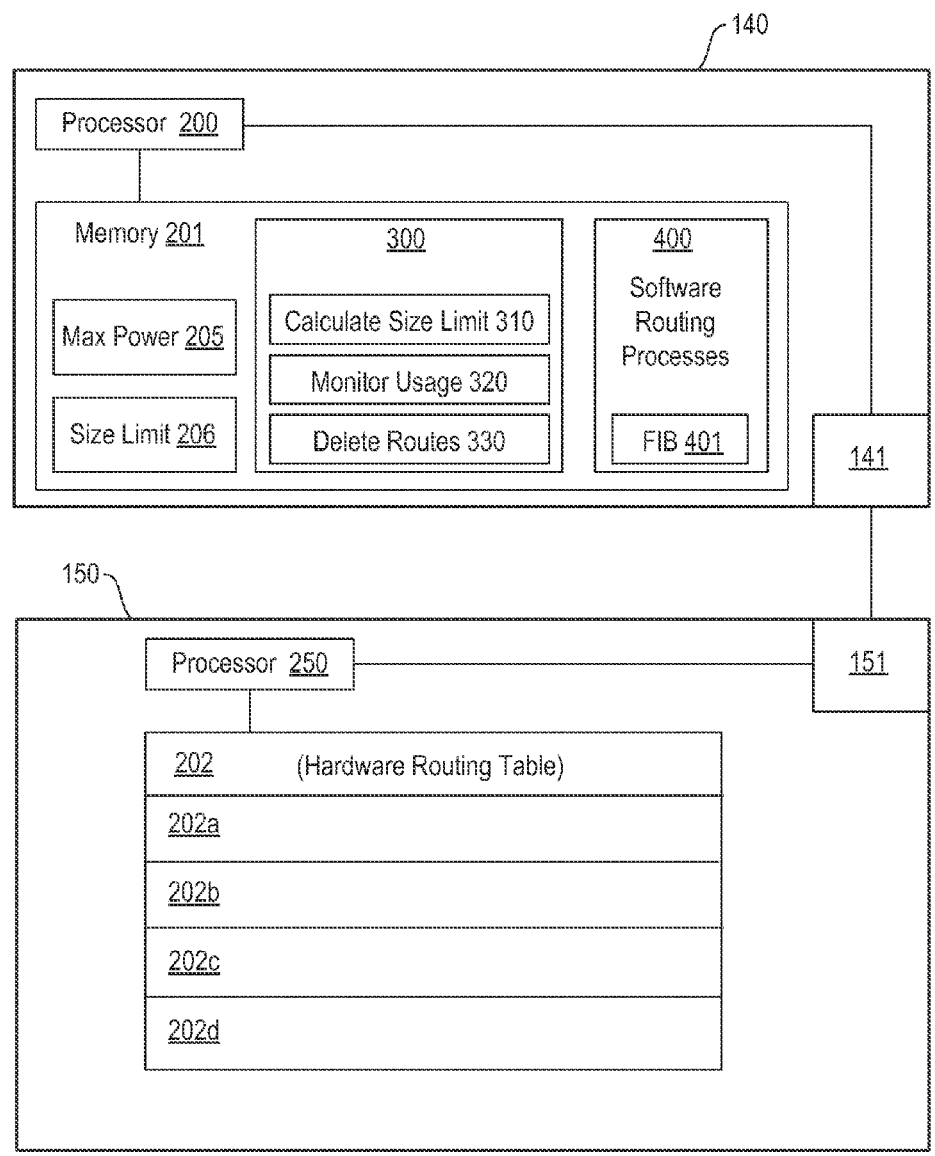
FIG. 4 is a schematic diagram showing a remote controller and a router, the remote controller having a management system for managing the size of the hardware routing table of the router

FIG. 4 shows an alternative arrangement in which the system for managing the table size is on a remote controller 140 which is separate from the router 150. The remote controller 140 may for instance communicate with the router 150 over a network or by a dedicated communication link. The remote controller 140 has a processor 200, a first memory 201 and an I/O module 141 for handling external communications e.g. communications with the router 150. The first memory 201 stores a maximum power for the hardware routing table 205, a size limit 206 and machine readable instructions 300 executable by the processor 200, including a size limit calculating module 310, a route monitoring module 320 and a route deleting module 330 as described in FIG. 2. The first memory also stores a forwarding information base 401 and machine readable instructions 400 for software routing which may use the forwarding information base 401.

The router 150 comprises a processor 250, an I/O module 151 for handling external communications and a memory 202 storing a hardware routing table (which may have entries 202a, 202b, 202c, 202d etc). The memory 202 may be a ternary content addressable memory.

The machine readable instructions 300 and 400 of the remote controller carry out the same functions as described above in FIG. 2. The remote controller 140 monitors usage of entries in the hardware routing table 202 of the router 150 by communicating with the router through the I/O modules 141 and 151. Further, when an entry is to be added to or deleted from the hardware routing table, the remote controller 140 handles the process by sending instructions to the router 150. While the router 150 in FIG. 4 has its own processor 250, in other arrangements the router 150 may just comprise a hardware routing table (e.g. TCAM) which is addressed by a processor of the remote controller over the network or other communication link.

While FIG. 4 gives one example, it is not the only possible configuration, and the data packet routing and hardware routing table management functions may be distributed between the router and the remote controller in various other ways. For example, the Forwarding Information Base 401 and machine readable instructions 400 for software routing may be stored on and executed by the router rather than the remote controller. In this case managing the size of the routing table and monitoring of entry usage is carried out by the remote controller, while both the software and hardware routing processes are executed by the router. In another example, the monitoring of table entries may be carried out by the router, in which case the remote controller acts as a management device which a user or administrator can use to configure the table size or power requirements. The remote controller then relays the table size or power requirements to the router and the router itself carries out the monitoring functions and determines when to delete entries based on usage criteria set by the remote controller.

Figure 5:
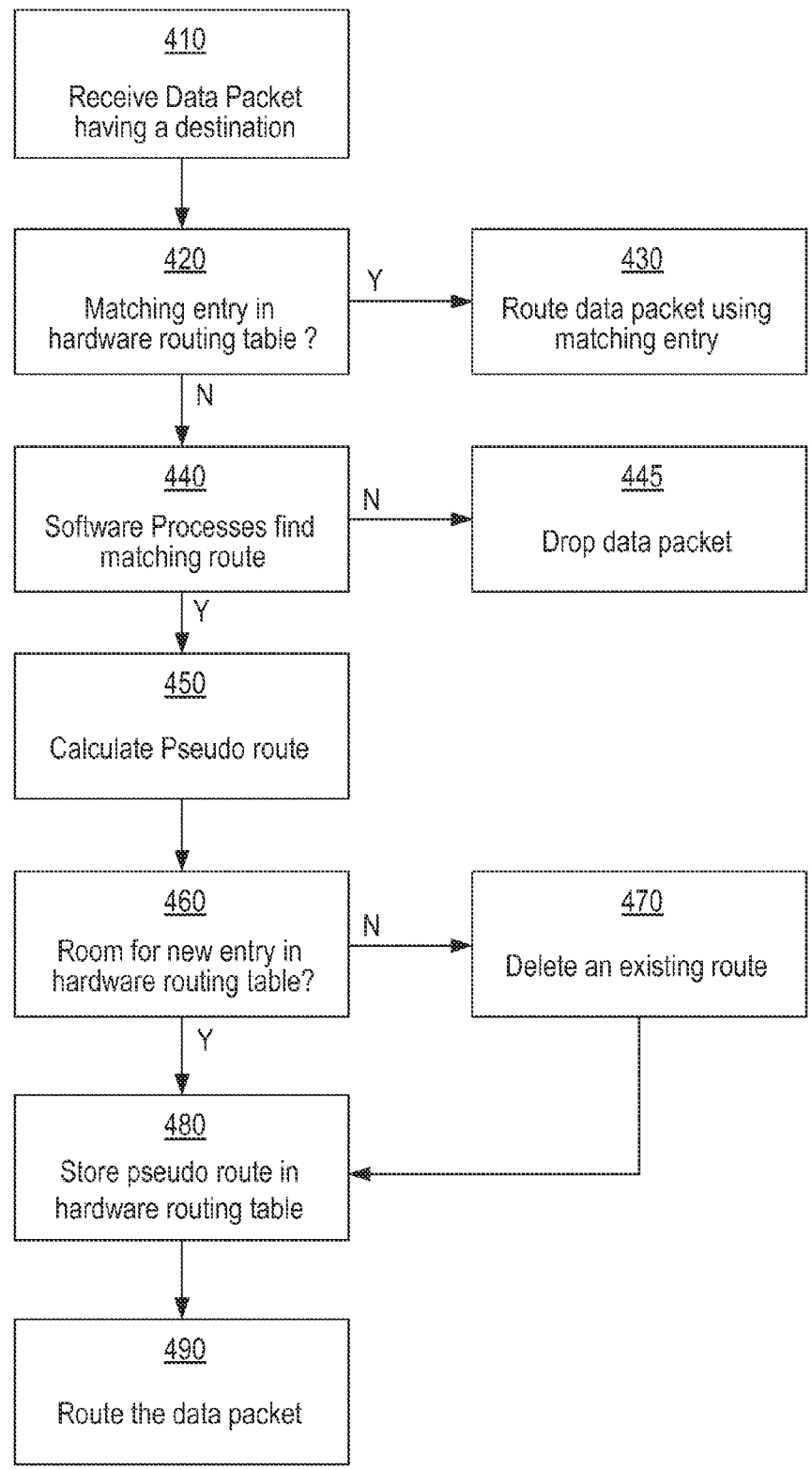
FIG. 5 shows an example of a method for routing a data packet.

FIG. 5 shows an example of a method of routing data packets employed by the router 200 of FIG. 2. Essentially the same process could also be used for the configuration of FIG. 4. At 410 a data packet is received by the router. At 420 the processor 200 checks the hardware routing table 202 to find an entry matching the data packet's destination. If one or more matching entries exist in the hardware routing table then the most specific matching entry is returned and the processor routes the data packet according to the most specific matching entry at 430. If no matching entry is found in the hardware routing table then the processor uses the software routing processes at 440 to find a matching route. The software routing processes may refer to a Forwarding Information Base 401. The FIB 401 is a collection of routes which are stored in memory and used by the software routing processes to make a forwarding decision for the data packet. If no matching route is found by the software routing processes at 440 then the router drops the data packet at 445. If the software routing processes find a matching route then the matching route is used to calculate a pseudo route at 450. The definition of a pseudo route and an example of calculating a pseudo route is described in more detail later with reference to FIG. 6.

Referring again to FIG. 5, at 460 a check is made to see if there is room to add the pseudo route as an entry in the hardware routing table, without exceeding the specified size limit 206. If there is room then the pseudo route is stored as an entry in the hardware routing table at 480. If there is not enough room, then an existing hardware routing table entry is deleted at 470 and the pseudo route is added as a new entry entered at 480. The data packet is then routed according to the new entry at 490 (if it has not already been routed by the software routing processes).

Various modifications may be made to the method of FIG. 5 while still achieving the same result. For example, the deletion of an entry at 470 may be carried out using the method of FIG. 3A or 3B, or a different deletion method may be used. Alternatively the hardware routing table entries may be monitored over a time period, such that at the end of the time period entries are deleted if the maximum number has been exceeded and/or if any entries have fallen below a usage threshold. In this case the steps described in 460 and 470 may not be necessary. The order of the processes may be varied as well. For example 460 and 470 may be carried out before or after calculation of the pseudo route. Further routing of the data packet may be carried out immediately after a matching route has been found by the software routing process in 430, at the end after storing the pseudo route as an entry in the hardware routing table as shown in FIG. 5, or anywhere in between or in parallel with the other processes.

A pseudo route is a route based on a destination specified by a data packet and a matching route for said destination in the forwarding information base (FIB), but which has a mask length calculated such that it does not overlap with any other routes in the FIB. As a pseudo route does not overlap any of the entries in the FIB, it will not overlap any entries in the hardware routing table either. The reason for calculating a pseudo route is to prevent entries in the hardware routing table from overlapping. The use of pseudo routes allows an order-dependent hardware routing table (one which returns only the first matching entry) to be managed without the restriction of order dependency. This is because if entries in the hardware routing table do not overlap, then for any input destination address there should only be one matching entry and so order of the entries in the table is not important. If entries in the hardware routing table overlap then the order of the route entries becomes important; e.g. the order may be used to select which route to output as the 'most specific route' in the case of multiple matches for an input destination. When order is important, adding and deleting entries may be complicated because adding a new entry may require moving of many other entries to maintain the correct order. However, where routes do not overlap this problem is avoided as the order of entries is not so significant. In one example, the hardware routing table is empty when the router is initialized and entries are made by calculating and entering (non-overlapping) pseudo routes based on matching routes found by the software 400; if all the hardware routing table entries are made in this way, then the entries do not overlap.

Figure 6:
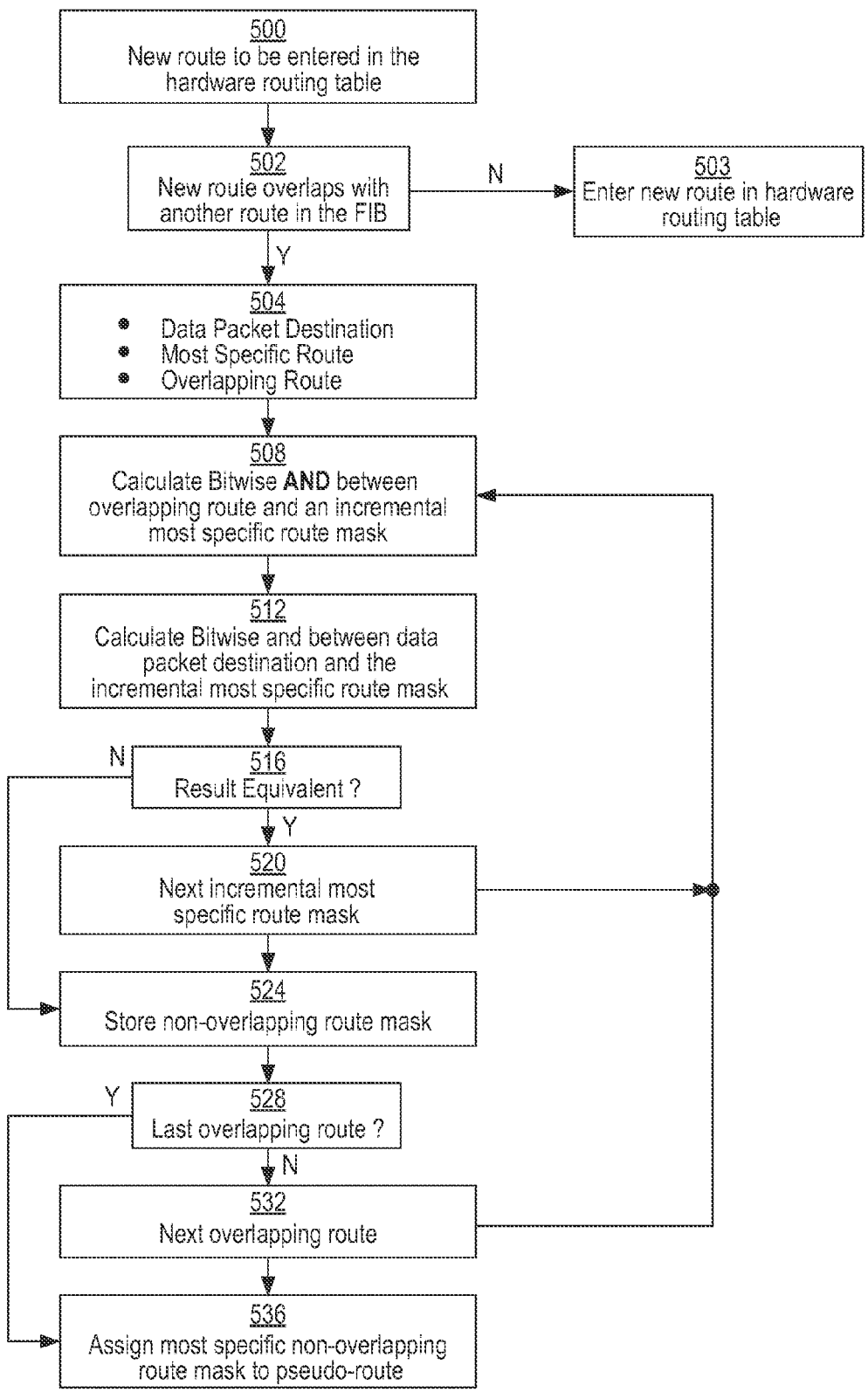
FIG. 6 shows an example of a method for calculating a pseudo route.

FIG. 6 illustrates one example of a method for calculating a pseudo route. Further, calculation of pseudo routes is described in more detail in U.S. Ser. No. 11/081,470, which was published as US 20060209845 and is incorporated herein by reference.

Referring to box 500 of FIG. 6, the most specific route matching the packet destination is found (selected) by the software routing processes 400. At 502 the FIB is checked for any overlapping routes which overlap with the most specific route. If there are no overlapping routes then the most specific route can be entered to the hardware routing table directly. If the routing table has already reached the size limit then the most specific route may be entered by overwriting an existing entry selected based on usage criteria.

Otherwise, if the most specific route overlaps a route already in the FIB, then a pseudo route should be calculated and the method proceeds to 504. At this point there are at least three parameters: a) a data packet destination; b) a most specific route; and c) an overlapping route. A pseudo route is the calculated by comparing an incremental overlapping route mask to a specific route mask and a data packet destination. The incremental overlapping route mask is incremented and compared until no overlap exists. The resulting mask is then applied to the data packet destination to form a pseudo-route. A specific example will follow the general discussion below in order to further clarify the method.

At 508 a bitwise AND may be calculated between an incremental overlapping route mask and a most specific route mask. Generally speaking, a bitwise operator treats its operands as a vector of bits rather than as a single number. In alternative arrangements other bitwise operators or other methods of calculation may be utilized in determining whether respective routes overlap. An increment, in this example, refers to a bit increment of a mask rather than a decimal increment as will be illustrated in further detail below. At 512, a bitwise AND may be calculated between a data packet destination and a most specific route mask. As noted for 508, other bitwise operators or other methods of calculation may be utilized in determining whether respective routes overlap. The results of calculations from 508 and 512 are then evaluated at 516 to check if they are equivalent. If the results are equivalent, then at 520 the method increments a most specific route mask by 1 and continues to 508. Equivalence at 516 indicates that the routes under inspection are overlapping. Since pseudo-routes must be non-overlapping, then the incremental overlapping route mask currently under inspection is not appropriate for a pseudo-route.

If the method determines that a result is non-equivalent at 516, then at 524 the method stores a non-overlapping route mask which has been generated from an incremental overlapping route mask. The method then determines whether the last overlapping route in the FIB has been evaluated at a 528. If the last overlapping route has not been evaluated, a next overlapping route from the FIB is selected for evaluation at a 532 whereupon the method returns to 508. Generally speaking, overlapping routes are not the same as matching routes although they may be in some cases. For example, a route 10.1.7.5 would "match" a route 10.1.0.0/16. The route 10.1.0.0/16 has overlap with a route 10.1.2.0/24, because both routes include the set of 10.1.2.0-10.1.2.255 destinations. Destination 10.1.7.5 would not match 10.1.2.0/24. All overlapping routes will be similarly evaluated with respect to a most specific route and a data packet destination. When all overlapping routes in the FIB have been evaluated, a most specific non-overlapping route mask may be assigned to the data packet destination to form the pseudo-route at a step 536.

Figures 7A, 7B:
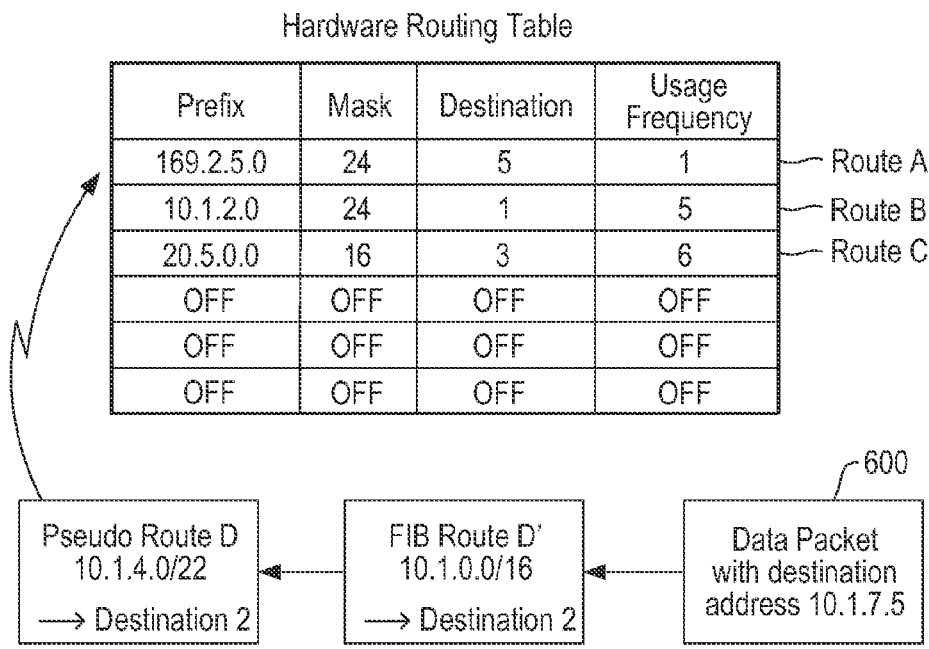
FIG. 7A shows an example of a hardware routing table.
FIG. 7B shows an example of a portion of a forwarding information base.

A specific example of the method of FIG. 6 will be described after a brief discussion of FIGS. 7A and 7B. FIG. 7B is an example of a portion of a FIB. The FIB stores all the routes which the router is currently aware of There will typically be hundreds of thousands of routes in the FIB or even more. FIG. 7A is an example of a hardware routing table, which typically has many fewer entries than the FIB. In the example of FIG. 7A, the hardware routing table has room for six entries, however only three entries are occupied with routes A, B and C. The remaining entries are switched off as a size limit of three entries has been specified due to power constraints. In practice the hardware routing table may be much bigger, perhaps thousands of entries, tens of thousands or even more—as technology progresses routing tables have tended to get larger. However for illustrative purposes only three active entries and six entries in total are shown in the example of FIG. 7A).

The routes can be written as a prefix followed by a mask. For example route B can be written as 10.1.2.0/24, where 10.1.2.0 is the prefix and 24 is the mask length. The mask length indicates the number of bits which must coincide for a destination to match that route. As route B has a mask length of 24 bits, any data packets having a destination address matching the first 24 bits of route B are considered a match. For example, a data packet having a destination 10.1.2.5 would be deemed to match route B and forwarded to destination 1. FIG. 7A also shows the relative usage frequency of each entry of the hardware routing table. However, in practice the usage frequency may be stored in the first memory 201 rather than the second memory 202 or may be calculated on the fly.

Now imagine that a data packet 600 having a destination of 10.1.7.5 is received and needs to be routed. No match for this destination is found in the hardware routing table and therefore a software routing process is used. The software routing process searches the FIB and finds a most specific matching route D' (10.1.0.0/16) which forwards packets to a destination 2. The router (or remote controller) will then want to add route D' (10.1.0.0/16) to the hardware routing table so that similar future packets can be routed more efficiently (hardware routing is typically much quicker than software routing). However route D' (10.1.0.0/16) overlaps with route B' (10.1.2.0/24), which is already in the FIB. Therefore a pseudo route D is calculated based on the overlapping route D' and the destination specified by the data packet 10.1.7.5.

Referring to 504 of FIG. 6, in the situation described above there is:—

A data packet destination 10.1.7.5

A most specific matching route 10.1.0.0/16 (which directs packets to destination 2)

And an overlapping route 10.1.2.0/24 (which directs packets to destination 1)

The overlapping route may also be referred to as an 'overlapping route mask', as it comprises both a prefix and a mask (see paragraph [0003] above).

Calculation of a pseudo-route would proceed through several iterations as shown in the table below. The following abbreviations are used:—
ORM=Overlapping Route
DPD=Data Packet Destination
IMSRM=Incremental Most Specific Route Mask

|  | ORM AND IMSRM (step 508) | DPD AND IMSRM (step 512) | EQUAL? (step 516) |
| --- | --- | --- | --- |
| Iteration 0: | 10.1.2.0 AND /16 = 10.1.0.0 | 10.1.7.5 AND /16 = 10.1.0.0 | Yes |
| Iteration 1: | 10.1.2.0 AND /17 = 10.1.0.0 | 10.1.7.5 AND /17 = 10.1.0.0 | Yes |
| Iteration 2: | 10.1.2.0 AND /18 = 10.1.0.0 | 10.1.7.5 AND /18 = 10.1.0.0 | Yes |
| Iteration 3: | 10.1.2.0 AND /19 = 10.1.0.0 | 10.1.7.5 AND /19 = 10.1.0.0 | Yes |
| Iteration 4: | 10.1.2.0 AND /20 = 10.1.0.0 | 10.1.7.5 AND /20 = 10.1.0.0 | Yes |
| Iteration 5: | 10.1.2.0 AND /21 = 10.1.0.0 | 10.1.7.5 AND /21 = 10.1.0.0 | Yes |
| Iteration 6: | 10.1.2.0 AND /22 = 10.1.0.0 | 10.1.7.5 AND /22 = 10.1.4.0 | No (Move to step 524) |

At step 508 of iteration 0 a bit-wise AND is performed between the overlapping route and the Incremental Most Specific Route Mask (IMSRM). In this example the IMSRM starts as a /16 mask. So at step 508:—
(non-significant bits are shown in decimal or 'x')
Overlapping route 10.1.00000010.xxxxxxxx
IMSRM 1.1.00000000.xxxxxxxx
Bitwise AND result 10.1.00000000.xxxxxxxx At step 512 of iteration 0, a bit-wise AND is performed between the data packet destination and the Incremental Most Specific Route Mask (currently a /16 mask)
(non-significant bits are shown in decimal or 'x')
DP Destination 10.1.00000110.00000101
IMSRM 1.1.00000000.xxxxxxxx
Bitwise AND result 10.1.00000000.xxxxxxxx At step 516 it is found that the results of steps 512 and 516 are equal, so the IMSRM is incremented by 1 bit (to /17) and another iteration is performed. This continues until at iteration 6 the IMSRM is incremented to /22:—

(non-significant bits are shown in decimal or 'x')
Overlapping route 10.1.00000010.xxxxxxxx
IMSRM 1.1.11111100.xxxxxxxx (a /22 mask)
Bitwise AND result 10.1.00000000.xxxxxxxx
(non-significant bits are shown in decimal or 'x')
DP Destination 10.1.00000110.00000101
IMSRM 1.1.11111100.xxxxxxxx (a /22 mask)
Bitwise AND result 10.1.00000100.xxxxxxxx As the results of steps 512 and 516 are not equal, this indicates that when a /22 mask is applied to the overlapping route and the data packet destination, the two do not overlap. This mask is therefore stored as a 'non-overlapping route mask' at 524. The method then continues until all overlapping routes in the FIB are considered whereupon the method assigns the most specific non-overlapping route mask to the destination in order to form a pseudo-route. The most specific non-overlapping route mask is the mask having the highest numeric value (i.e. the highest number of significant bits). In this example there is just one overlapping route and so the most specific non-overlapping route mask is the /22 mask. This mask is applied to the destination 10.1.7.5 to arrive at the pseudo route D:10.1.4.0/22. This pseudo route D may then be stored in the hardware routing table. The pseudo route D forwards data packets to destination 1 (the same destination as the FIB route D' on which it is based). Even if the pseudo route D is stored as an entry at the top of the hardware routing table in the location currently occupied by route A, this should not cause a problem because the pseudo route D does not overlap with any other entries in the hardware routing table. This non-overlapping feature of pseudo routes makes it possible to delete old entries and add new entry without consideration of the order of the hardware routing table.

If pseudo routes were not used, then it is likely that some entries in the hardware routing table would overlap. This would eventually cause a problem; because if entries overlap, then their relative order in the table becomes important and the overlap may result in sub-optimum routing. For example, if the number of active entries in the hardware routing table is limited to three (due to power constraints) and the least frequently used entry in the table is route A, then when new route D' is entered it will replace the entry for route A at the top of the table. Route D' (10.1.0.0/16) would be positioned above route B (10.1.2.0/24) in the hardware routing table. When presented with a destination for which there are several matches, the hardware routing table will return the entry nearest the top of the table. So a data packet having a destination 10.1.2.5 would then be routed by route D' to destination 2 as route D' (10.1.0.0/16) is nearest the top of the table. However, it would be better to route the data packet by route B to destination 1, as route B (10.1.2.0/24) also matches the destination and is in fact more specific. Incorrect or sub-optimum routing may result. To avoid this problem, a pseudo route may be calculated instead and entered into the table as described above. If a hardware routing table entry does not overlap another entry in the hardware routing table, but overlaps a route in the FIB, there is still a problem as the overlapped FIB route may be a better match for certain data packets, but will be missed as the hardware routing table is consulted first and the FIB only referred to if there is no match in the hardware routing table.

The hardware routing table shown in FIG. 7A and in the examples generally contemplated in this specification is a single undivided table from which it is possible to find a matching route through a single look up. While it is possible to split a hardware routing table, such as a TCAM, into sub banks, with each bank containing plural entries which are a subset of routing entries of the entire table, and while doing so may reduce power consumption, a routing table split into multiple banks requires multiple look ups to return a matching route and this can negatively affect routing performance.

What is claimed is:

1. A system for managing a size of a hardware routing table of a router; the system comprising a processor and a first memory storing a size limit defining a maximum number of entries to be stored in the hardware routing table and machine readable instructions which are executable by the processor to:
   calculate said size limit based on a maximum power level for the hardware routing table; and
   monitor usage of entries in said hardware routing table and delete entries based on usage criteria so as to maintain the number of entries stored in the hardware routing table at or below the maximum number of entries specified by said size limit.

2. The system of claim 1 wherein said system is implemented as an internal part of the router, said router comprising the hardware routing table for storing a plurality of entries, each entry corresponding to a route for routing data.

3. The system of claim 1 wherein said system is implemented on a remote management apparatus for managing the hardware routing table of the router, said router being separate from the remote management apparatus.

4. The system of claim 1 wherein the system is distributed between a remote management apparatus and the router, said router being separate from the remote management apparatus.

5. The system of claim 1 wherein the machine readable instructions comprise instructions to delete entries in the hardware routing table which fall below a usage threshold.

6. The system of claim 1 wherein the machine readable instructions comprise instructions to delete an entry in the hardware routing table based on usage criteria when space is needed to enter a new entry.

7. The system of claim 1 wherein the machine readable instructions further comprise instructions to enter a new entry in the hardware routing table based on a selected route chosen by software routing processes, the instructions to enter a new entry in the hardware table comprising instructions to generate a pseudo route and enter said pseudo route as the new entry in the hardware routing table, said pseudo route being based on said selected route and not overlapping with any routes already stored in a forwarding information base.

8. The system of claim 7 wherein said selected route is for routing a data packet having a destination; and wherein said instructions to generate a pseudo route comprise instructions to:
   a) find any routes already stored in the forwarding information base of the router which overlap with the selected route;
   b) compare an overlapping route mask with an incremental most specific route mask of the selected route;
   c) compare said destination with an incremental most specific route mask;
   d) if the results from a) and b) are equivalent, then repeat a) and b);
   e) if results from a) and b) are non-equivalent, then store the incremental most specific route mask as a non-overlapping route mask; and
   f) apply the most specific non-overlapping route mask to the destination in order to calculate the pseudo route.

9. The system of claim 1 wherein the machine readable instructions comprise instructions to:
- receive a data packet having a destination;
- look for an entry matching said destination in the hardware routing table;
- if no match is found in the hardware routing table, use a software routing process to find a matching route, convert the matching route returned by the software routing process into a pseudo route, enter the pseudo route as a new entry in the hardware routing table; and
- route said data packet according to said matching route or according to said pseudo route.

10. The system of claim 1 wherein the hardware routing table does not contain overlapping entries.

11. The system of claim 1 wherein the size limit is less than a maximum number of routes which a second memory is capable of storing.

12. The system of claim 1 wherein the size limit is configurable.

13. The system of claim 1 wherein the hardware routing table is stored on ternary content addressable memory.

14. The system of claim 1 wherein the hardware routing table is a single undivided table in which a most specific matching entry for a destination address can be found by a single look up operation.

15. A method of managing power used by a hardware routing table stored in a memory of a router, the method comprising:
- using a processor to calculate a maximum number of entries to be stored in the hardware routing table based on a maximum power limit, and
- limiting the number of entries stored in the hardware routing table at or below said maximum number by monitoring usage of entries in said routing table and deleting entries based on usage criteria.

16. The method of claim 15 wherein an entry is deleted upon determining that usage of said entry falls below the usage threshold or when space is needed to store a new entry in the routing table.

17. A method of managing a hardware routing table in ternary content addressable memory (TCAM) comprising:
- calculate a maximum number of entries to be stored in the hardware routing table based on a maximum power limit,
- powering on only a portion of the table entries at any one time,
- adding new entries to the table when new routes are found,
- turning off older or less frequently used entries in the table based on usage criteria, and
- adding some or all of said new entries as pseudo routes to ensure that no entries in the hardware routing table overlap.

* * * * *